(12) United States Patent
Chien

(10) Patent No.: US 11,873,971 B2
(45) Date of Patent: Jan. 16, 2024

(54) LED NIGHT LIGHT HAS PROJECTION OR PINHOLE IMAGE FEATURE

(71) Applicant: Tseng-Lu Chien, Walnut, CA (US)

(72) Inventor: Tseng-Lu Chien, Walnut, CA (US)

(73) Assignees: Aaron Chien, Walnut, CA (US); Hsin-Yi Wang, Walnut, CA (US); Te-Ju Chien, Walnut, CA (US)

(*) Notice: Subject to any disclaimer, the term of this patent is extended or adjusted under 35 U.S.C. 154(b) by 0 days.

(21) Appl. No.: 17/169,625

(22) Filed: Feb. 8, 2021

(65) Prior Publication Data

US 2021/0262626 A1 Aug. 26, 2021

Related U.S. Application Data

(62) Division of application No. 12/834,435, filed on Jul. 12, 2010, now abandoned, which is a division of (Continued)

(51) Int. Cl.
| | |
|---|---|
| *F21S 8/00* | (2006.01) |
| *F21V 14/02* | (2006.01) |
| *F21V 29/00* | (2015.01) |
| *F21V 21/14* | (2006.01) |
| *F21V 21/22* | (2006.01) |

(Continued)

(52) U.S. Cl.
CPC ............. *F21S 8/035* (2013.01); *F21K 9/232* (2016.08); *F21S 10/007* (2013.01); *F21V 5/04* (2013.01); *F21V 13/02* (2013.01); *F21V 14/003* (2013.01); *F21V 14/006* (2013.01); *F21V 14/08* (2013.01); *F21V 17/02* (2013.01); *F21V 21/14* (2013.01); *F21V 21/22* (2013.01); *F21V 23/00* (2013.01); *F21V 29/00* (2013.01); *F21V 21/30* (2013.01); *F21V 23/0471* (2013.01); *F21W 2121/00* (2013.01); *Y10S 362/80* (2013.01); *Y10S 362/806* (2013.01)

(58) Field of Classification Search
CPC ......... F21S 8/035; F21S 10/007; F21V 14/02; F21V 14/025
See application file for complete search history.

(56) References Cited

U.S. PATENT DOCUMENTS 3,401,596 A * 9/1968 Hirsch ...................... F21L 4/00
362/310
4,285,028 A 8/1981 Sundin et al.
(Continued)

FOREIGN PATENT DOCUMENTS

EP 1411290 A1 4/2004

*Primary Examiner* — Sean P Gramling
(74) *Attorney, Agent, or Firm* — BACON & THOMAS, PLLC

(57) ABSTRACT

An LED and/or laser light for night time or dark area use, such as a plug-in wall outlet night light or direct current (DC) operated desktop light, includes projection or pin-hole image features to project or present an image, message, data, logo, or time on a ceiling, walls, floor, or other desired surface, or an cover surface, inner housing wall. The optics piece surround light source including an optics-lens, slide, openings, cut-outs, film, grating, or holographic element to create an image at a desired location. The night light may have an adjustable angle or distance between light source and optics piece, as well as other adjustable position, location, or orientation features.

6 Claims, 9 Drawing Sheets

Related U.S. Application Data application No. 12/292,153, filed on Nov. 12, 2008, now Pat. No. 7,871,192.

(51) Int. Cl.

| | |
|---|---|
| *F21K 9/232* | (2016.01) |
| *F21V 17/02* | (2006.01) |
| *F21V 14/00* | (2018.01) |
| *F21S 10/00* | (2006.01) |
| *F21V 14/08* | (2006.01) |
| *F21V 5/04* | (2006.01) |
| *F21V 13/02* | (2006.01) |
| *F21V 23/00* | (2015.01) |
| *F21V 21/30* | (2006.01) |
| *F21V 23/04* | (2006.01) |
| *F21W 121/00* | (2006.01) |

(56) References Cited

U.S. PATENT DOCUMENTS

| | | | |
|---|---|---|---|
| 4,942,502 A * | 7/1990 | Ohashi | F21V 33/008 446/241 |
| 5,143,442 A * | 9/1992 | Ishikawa | G03B 21/00 362/184 |
| 5,321,449 A | 6/1994 | Coccoli et al. | |
| 5,324,224 A | 6/1994 | Anderson et al. | |
| 5,517,264 A | 5/1996 | Sutton | |
| 5,595,435 A | 1/1997 | Palmer et al. | |
| 5,752,766 A | 5/1998 | Bailey et al. | |
| 5,934,223 A | 8/1999 | Ellery-Guy | |
| 6,431,719 B1 | 8/2002 | Lau et al. | |
| 6,558,022 B2 | 5/2003 | Kawahara | |
| 6,744,693 B2 | 6/2004 | Brockmann et al. | |
| 6,779,905 B1 * | 8/2004 | Mazursky | F21V 1/10 362/86 |
| 7,267,444 B2 | 9/2007 | Black, Jr. | |
| 7,438,446 B1 | 10/2008 | McCann | |
| 7,478,912 B2 | 1/2009 | Black, Jr. | |
| 7,717,570 B2 | 5/2010 | Black, Jr. | |
| 7,832,917 B2 | 11/2010 | Chien | |
| 7,871,192 B2 | 1/2011 | Chien | |
| 8,083,377 B2 | 12/2011 | Chien | |
| 8,128,274 B2 | 3/2012 | Chien | |
| 2003/0076680 A1 | 4/2003 | Stekelenburg | |
| 2004/0027831 A1 | 2/2004 | Huang | |
| 2005/0111213 A1 | 5/2005 | Smith | |
| 2006/0194508 A1 * | 8/2006 | Johnson | A63H 3/006 446/268 |
| 2006/0227831 A1 | 10/2006 | Thuot Rann et al. | |
| 2007/0045276 A1 * | 3/2007 | Fisher | F23Q 7/16 219/268 |
| 2007/0109813 A1 | 5/2007 | Copeland | |
| 2008/0062685 A1 | 3/2008 | Belliveau et al. | |

* cited by examiner

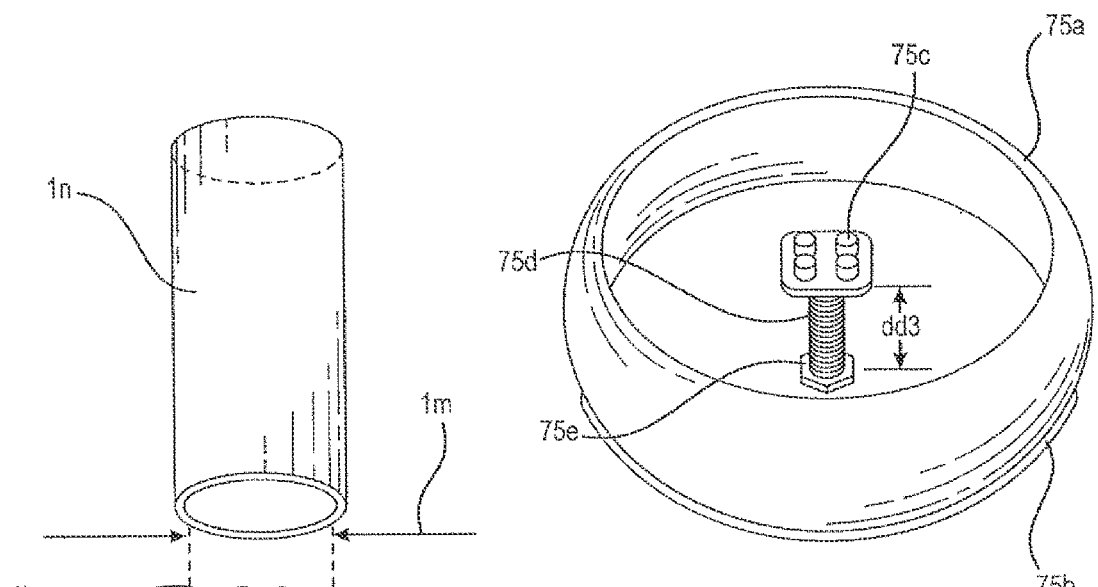
FIG. 7-3
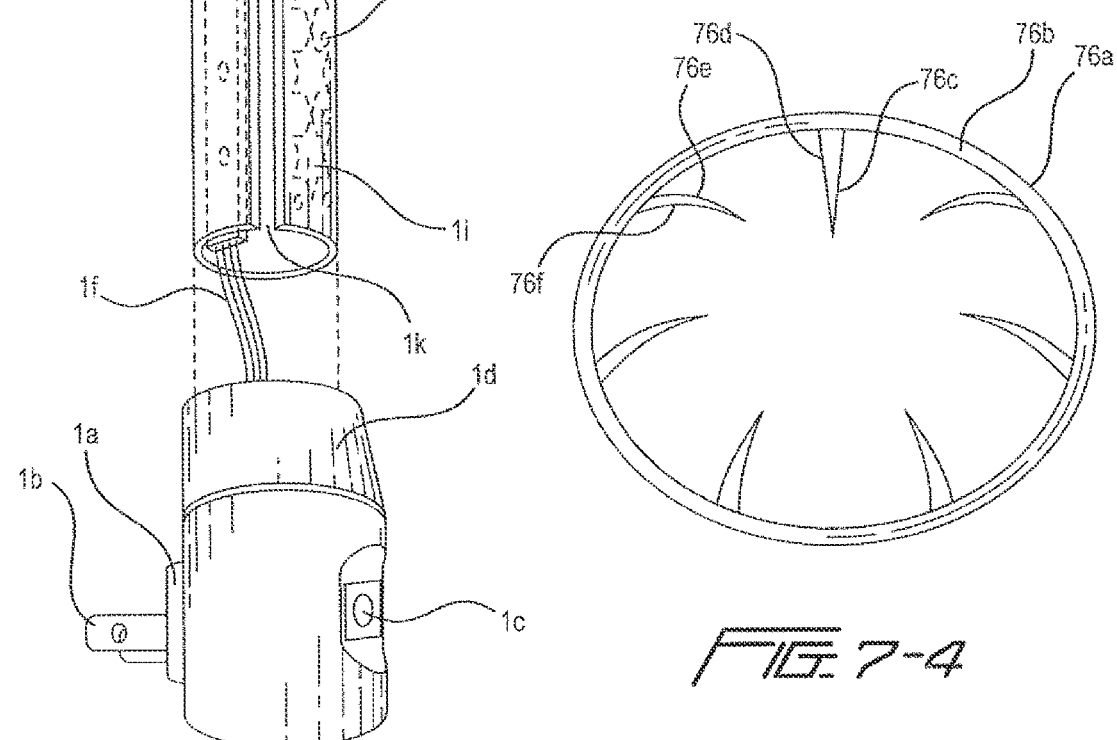
FIG. 7-4
FIG. 1

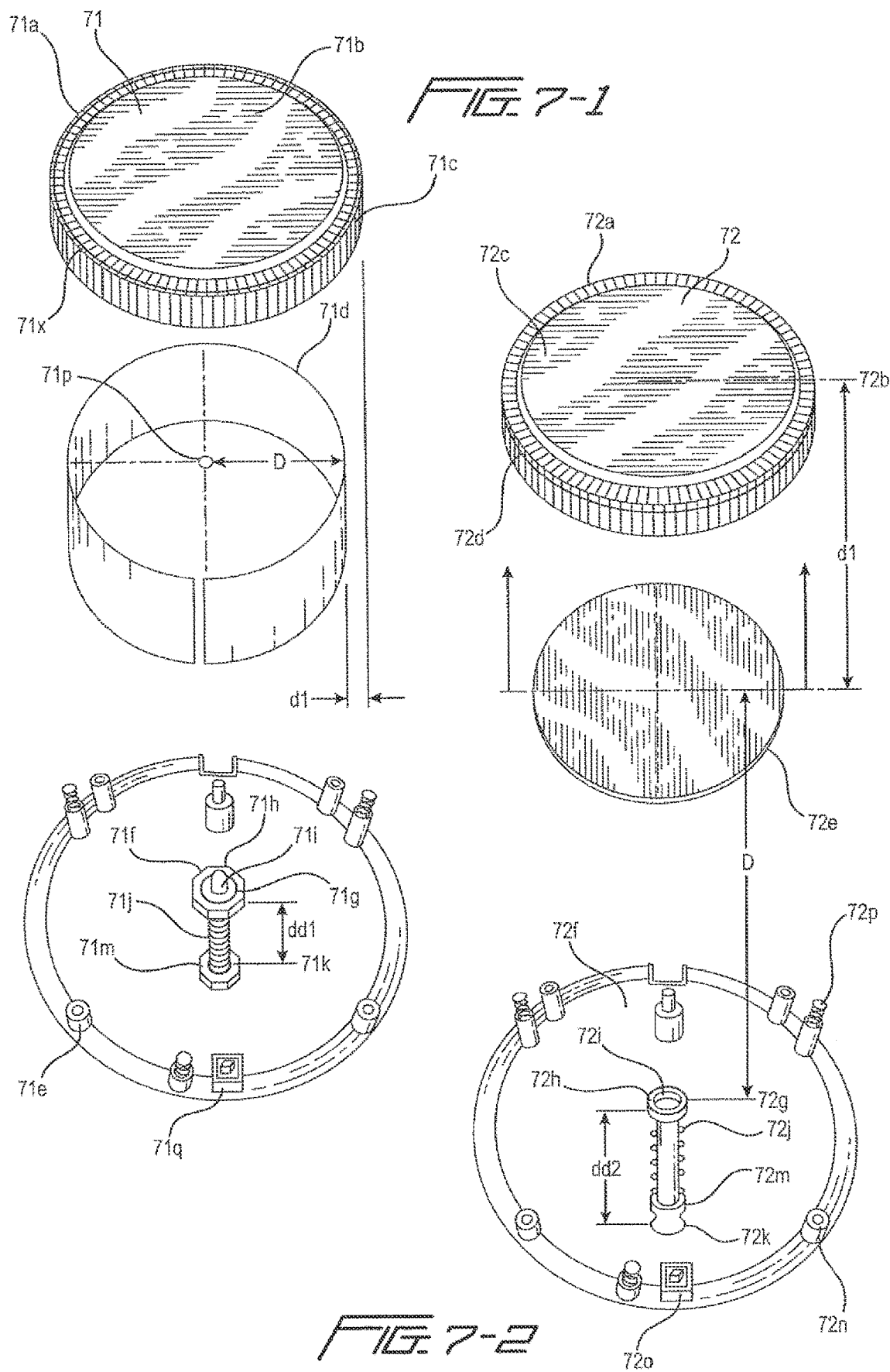

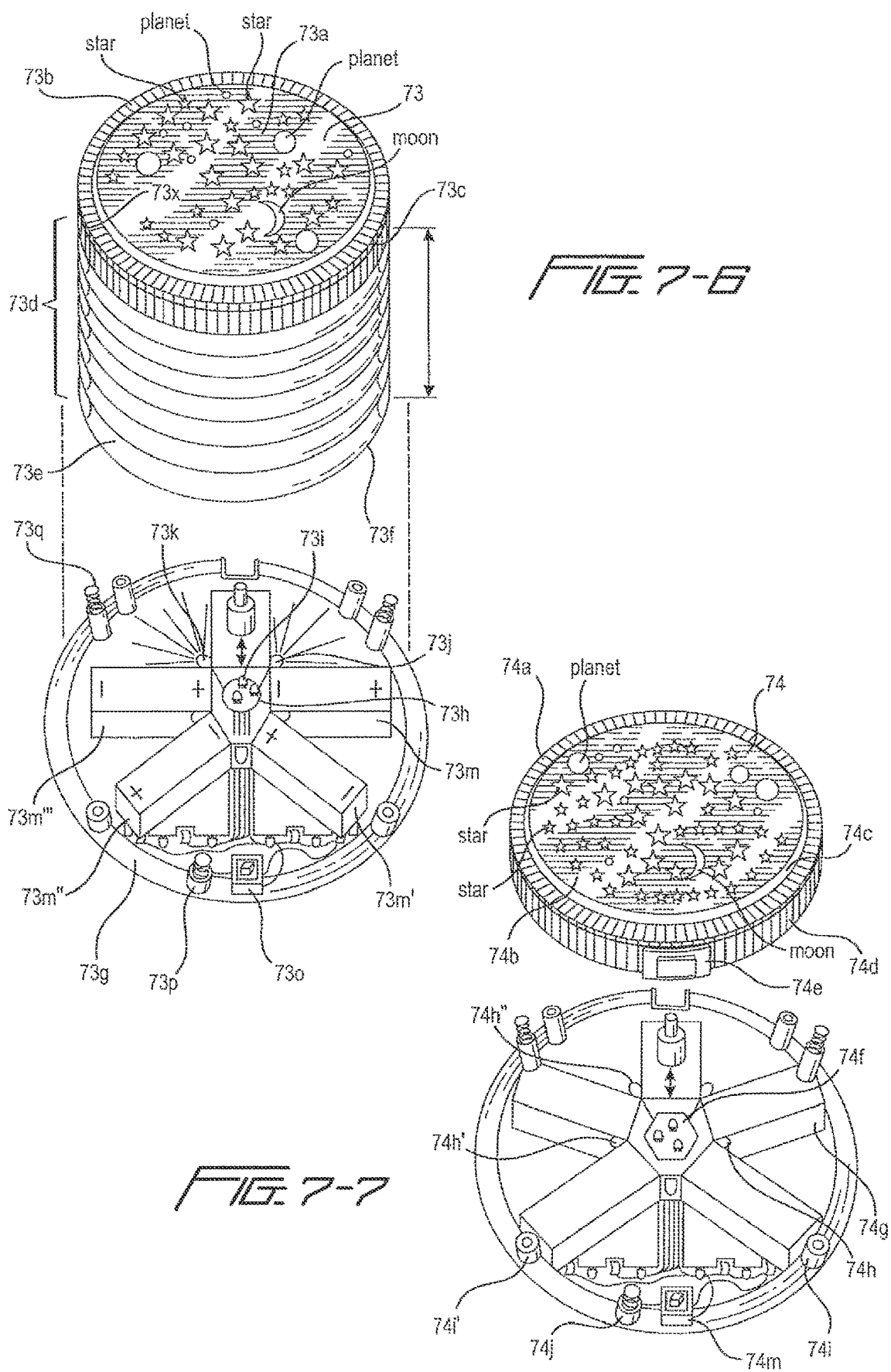

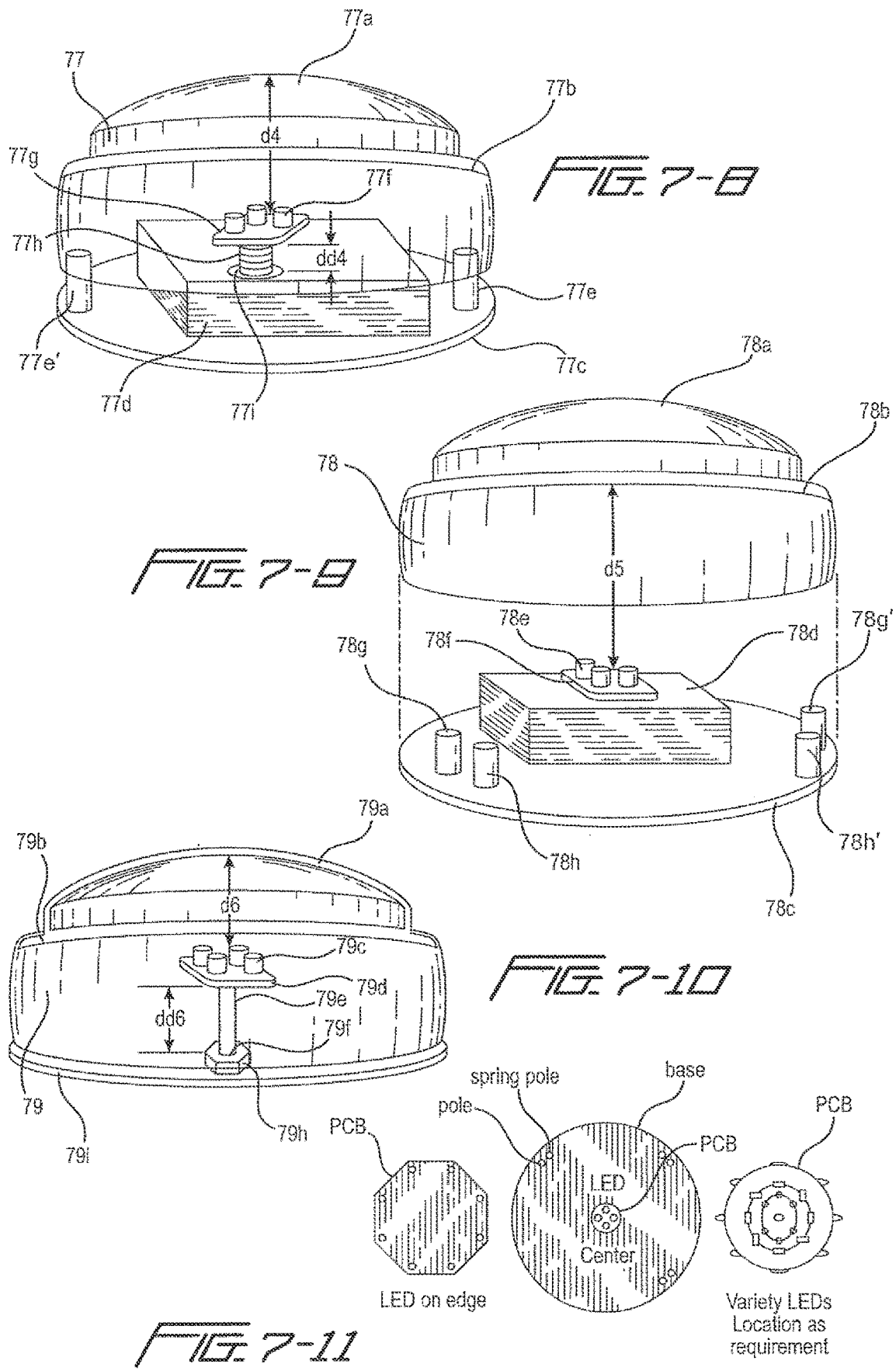

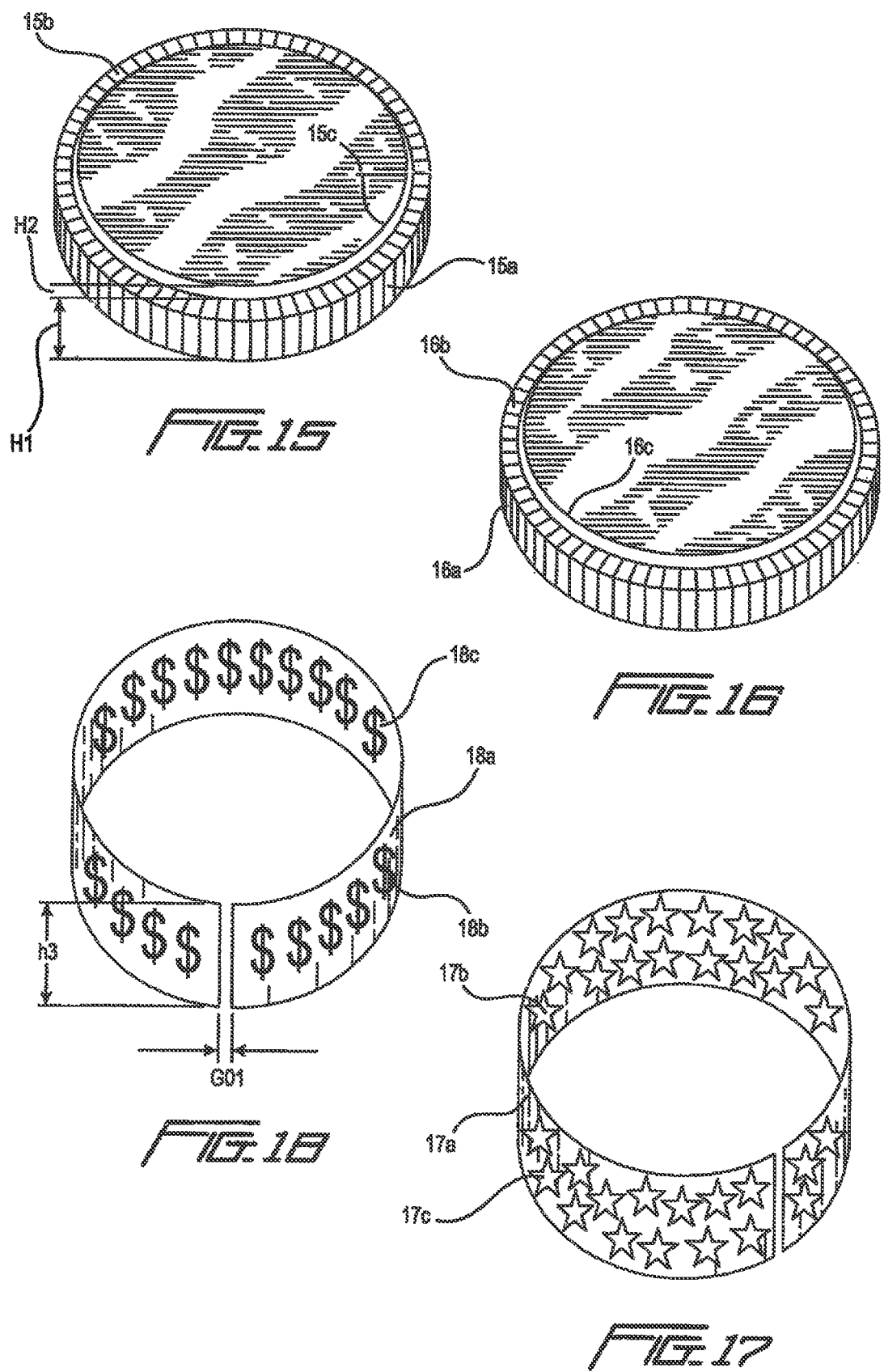

LED NIGHT LIGHT HAS PROJECTION OR PINHOLE IMAGE FEATURE

This application is a divisional of U.S. patent application Ser. No. 12/834,435, filed Jul. 12, 2010, which is a divisional of U.S. patent application Ser. No. 12/292,153, filed Nov. 12, 2008, each of which is incorporated herein by reference.

BACKGROUND OF THE INVENTION

This application has subject matter in common with U.S. patent application Ser. No. 12/318,470 ("Projection Night Light"); Ser. No. 12/318,473 ("LED Night Light Has Laser or Hologram Element(s)"); Ser. No. 12/073,889 ("LED track light device"); Ser. No. 12/073,095 ("LED light with changeable position with Preferred power source"); Ser. No. 12/007,076 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 11/527,631 ("LED Night light with interchangeable display unit") Ser. No. 11/498,881 ("Poly Night light"); Ser. No. 11/255,981 ("Multiple light source Night Light"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light") Ser. No. 11/527,628 ("Multiple Function Night light with Air Freshener"); Ser. No. 11/806,284 ("U.S. Patent Application LED Night light with more than one optics mediums"); Ser. No. 11/806,285 ("LED Night Light with multiple function"); and Ser. No. 11/806,711 ("Multiple LEDs Light with adjustable angle function").

The current invention provides a light image on a wall, ceiling, floor, other desired surface such as an optic means surface, or any other desired location to enable people to view a desired image such as a star, moon, planet, silver-river, universal image, cartoon character, family photos, or favorite image to cause people pleasure in a dark environment or when falling asleep in a nice environment. It is especially important for youth or kids' room applications to let them have their own favorite image surround them. The current invention has the following features:

1. It incorporates a simple optics-assembly to provide the projection features, the optics-assembly including a slide located between the LED and first optics means to enable easy assembly without the need for strict position and angle determination.

2. The slide may be a disc with a plurality of slides that can easily be changed by just rotating the disc to easily change the image in upgraded models.

3. The invention may incorporate a position change means for positioning a projector head to change image position, location, and/or size as desired by a simple touch, rotation, push, bend, or twist, so that any outside force applied to the night light cause the image to change position, location, or size instantly.

4. The current invention can have compact dimensions when incorporated with a simple optics-assembly which allows the distance from LED tip to slide to be reduced to zero so that the slide contacts the first optics means.

5. The current invention has no hazardous material such as a glass lens, but instead uses a hinge box with projector means inside to provide the precise positioning needed for a variety of lens types.

6. The current invention may be incorporated with adjustable focus means to adjust the lens distance to fit a variety of indoor spaces to keep any image perfectly clear.

7. The current invention—may incorporate a trans-forming construction to change the projector head to a variety of positions and create an image at any desired location.

8. The current invention provides an image surface that is perpendicular to the light beam path, for example a ceiling so that the image can be seen while asleep. Some prior art image projectors on top of a night light need too many expensive and fragile lenses, such as a reflective lens, condensing lens, grating lens, or projection/object lens that must be slid between these complicated lenses, causing a lot of limitations for mass production and night light unit dimensions.

9. The night light of the current invention can fit a majority of market available housings and meet U.S. safety standard requirements.

10. The night light of the current invention may have an adjustable distance between the light source(s) and the optics means (openings, films, hologram means, or grating means) to provide a clear image on desired surface(s). 11. The night light of the current invention may have a new arrangement for battery position, location, and orientation to allow the light source(s) to have the best position and hit the optics means to get the best light effects and performance.

12. The night light of the current invention may have a spiral arrangement for the batteries so that the light source
   (s) may be put on near center locations and emit light to an edge with a desired distance from the light source(s) to the optics means. It also can cover certain angled areas of all wall areas. This will get the best light performance and image size when applied to a hologram or grating laser film application.

The current invention represents a big improvement over all U.S. prior art including the following U.S. patents:

Prior art U.S. Pat. No. 5,517,264 (Sutton) discloses a projection night light with a preferred 7 Watt bulb (408)

A. which radiates too much heat so that a big distance from the bulb to the optics means is required. Because of the super high heat from the 7 Watt Bulb, the night light requires use of a glass material which is very big and dangerous to a user. Furthermore, the Sutton concept of using a glass reflection lens (604) to enable the image to be seen on the display screen (102) requires too complicated a construction and is not practical for a low-cost application. In addition, the glass lens is much too fragile, and that is too heavy for the prongs to stay tightly in the outlet.

B. Prior art U.S. Pat. No. 7,267,444 (Black, Jr.) dis-closes a projection night light which has the same problems as Sutton's, including use of too many lenses including (303) reflector mirror, (105) (405) condensing lens, (106) (406) adjusting lens, (403) grating lens (which grating lens corresponds to the one disclosed in the inventor's U.S. Pat. No. 5,667,736), and (415) project/object lens. Some of lens need to make of a glass material which is very fragile and will be broken because it is too heavy to hold tightly in an outlet. The Black patent also emphasizes that the night light disclosed therein projects an image onto a surface parallel to a path of the light beam, through projection means on top of the night light's wall. This is the reason why Black needs a lot of special optics lenses and slides (109) (209) (309) (409) between the glass lens.

Other prior art includes:

C. U.S. Pat. No. 6,824,296—Souze et al for Rotating lens with Bulb (78).

D. U.S. Pat. No. 6,889,918—Yaniv-Projector is wearable and projects an image onto screen (12).

E. U.S. Pat. No. 7,329,035—Feliciano Child Night Light for held or worn.

F. U.S. Pat. No. 7,438,446—McCann-Projector inside a hinged top box (20), None of these can pass a USA safety standard because they will pass weight and pulling tests. Not safe and not qualified at all.

The current invention of an LED light for night time use includes: (A) a plug-in wall outlet night light, or (B) a direct current (DC) operated night light with projection features to project an image, message, data, logo, or time onto a ceiling, walls, floor, optic means surface or any other desired surface.

The current invention has as a light source an LED or plurality of LEDs (such as disclosed in copending U.S. patent application Ser. No. 11/255,981, now allowed) to supply a visible light beam to pass through an optics means or more than one of the optics means (such as disclosed in copending U.S. patent application Ser. No. 11/806,284) and create an image on a desired surface or location with additional features preferably selected from the group including size, dimension, area, height, distance, color, brightness, time period, trigger means, light function, light performance, changeable focus, changeable slides, changeable geometric shape of the night light, and changeable projection head direction.

The current invention incorporates preferred optics means selected from the group consisting of an optics-lens, concave lens, openings, cut-outs, film, coiled film, printed piece, grating means, hologram means (such as disclosed in the inventor's U.S. Pat. No. 5,667,736) to create a preferred image at a desired location or surface.

The current invention combines various teachings of the inventor's co-pending U.S. patent application Ser. Nos. 11/255,981 and 11/806,284 for more than one light source and optics means with teachings of the inventor's U.S. Pat. No. 5,667,736 concerning grating or hologram techniques to create a lot of images and thereby et the best image projection on a wall, ceiling, floor, or surface of an optics means.

BRIEF DESCRIPTION OF THE DRAWINGS

FIGS. 1 to 3 illustrate a first preferred embodiment of an LED night light with image projection onto an optics means surface. These preferred night lights are plug-in type to connect with an electric outlet. The night light of FIG. 1 utilizes an optics film or optics lens and a transparent or translucent housing as the optics means to create a desired image on the optics means surface.

FIGS. 2 and 3 show a different viewing angles of the current invention's image projection on a wall, ceiling, floor, or optics means surface by a plug-in type night light featuring changeable slides.

FIGS. 7-1, 7-2, 7-3, 7-4, 7-5, 7-7, 7-8, and 7-9 show fourth and fifth preferred embodiments of a direct current (DC) operated LED night light with different optics means selected from openings, cut-outs, transparent or translucent optics means, grating means, hologram means, and films to form images at a desired location with adjustable light source position, location, and distance relative to the optics means to enable a clear image to be seen on a wall, ceiling, optics means surface, or any desired surface.

FIGS. 7-6 shows the manner in which the fourth and fifth battery desktop night light are arranged with optics films to fit a dome cover which has a variety cuts and which overlays or underlays the optics film to fit the dome cover properly.

FIGS. 7-10 shows the fourth and fifth preferred embodiments with different size PCBs and different LED arrangements to provide desired performance.

FIG. 7-11 shows different arrangements for LED on edge, center, donut, or different diameter circles on lower position Printing circuit board (PCB).

FIGS. 7 to 15 illustrate a variety of battery desktop night light of a direct current (DC) operated LED night light with different optics piece that may be selected from openings, cut-outs, transparent or translucent material, coiled film, printing piece, grating piece, hologram piece, and films to form images at a desired location with or without adjustable project lens position, location, or distance relative to the optics piece to cause a clear image to be seen on a wall, ceiling, optics means surface, or any desired surface.

FIGS. 16 to 20 illustrate a variety of arrangements of an LED or LEDs for the preferred embodiments of the direct current (DC) operated LED night light with different optics piece selected from openings, cut-outs, transparent or translucent material, grating means, coiled film, printed piece, hologram piece, and films to form the images at a desired location with or without adjustable light source position, location, or distance vis-a-vis the optics means to cause a clear image to be seen on a wall, ceiling, optics means surface, or any desired surface.

DETAIL DESCRIPTION OF THE PREFERRED EMBODIMENTS

Figure 2:
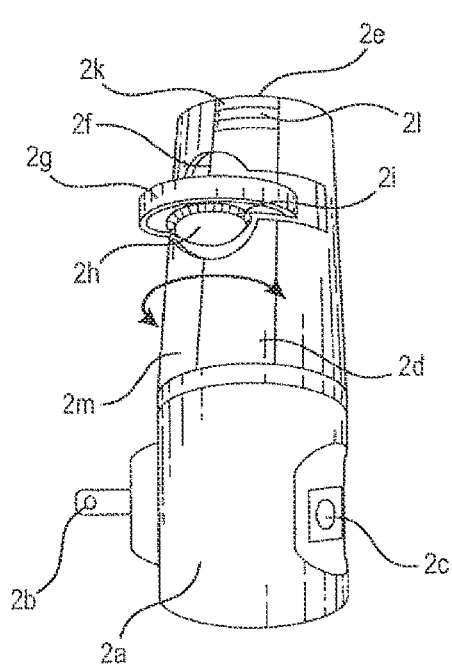

The LED night light with projection features of the current invention is different from the conventional marketplace's projection pen, projection key chain, projection toy, or commercial presentation projection equipment.

The current invention is mainly for the night light applications with LED or LEDs as a light source to directly plug into an outlet device, so the circuit needs to have a special design to convert AC 110V 60 Hz input power to drive the LED or LEDs, DC upgrade DC punk light, or toy project lite.

The current invention also applies to a direct current (DC) operated night light in which the LED or LEDs may be turned on by pushing or touching a housing. This is similar to the way a conventional puck or tap light is arranged to drive LED or LEDs turn on. The current invention, however, has big improvements having movable, detachable opaque outer cover or housing to show clear image on surrounding wall(s) while remove outer cover, and also shown image on cover while reassemble outer cover back to the light to upgrade of conventional puck light.

The current invention incorporates optics piece which may be selected from the group consisting of an optics film, slide, optics lens, telescope housing, film, grating piece, hologram film, transparent material, translucent material, openings, cut-outs with precision optics calculation and optics design to create an image, message, logo, characters, sign, time, or data to project on a desired surface such as a ceiling, walls, floor, optics-means surface.

The current invention also discloses a geometric design or shape night light, but is not limited to that of the preferred embodiments. Any alternative construction, shape, material, body such as toy, candle light work as the night or project light; including constructions have one of tilt, swivel, rotate, change position part(s), or have an adjustable focus still fall within the current invention scope as background description for all features of the current invention.

FIG. 1 shows an LED and/or laser night light made of plastic with an image formed by at least one LED (1g) as a light source to supply visible light beams. At least one optic piece is incorporated with the LED and/or laser (1g) which are selected from the group consisting of an optics-lens (1n), grating or optics film (1h), slide, piece has at least one of openings or cut-outs, transparent material (1n), translucent base (1d), grating piece (1h) or hologram piece (1h) for projecting or present the desired image (1j) (1i), message, data, logo, time on ceiling, walls, floor, desired surface, or optics piece or plastic housing surface (1h). At least one of the power source input by prong (1b), circuit (not shown), and trigger unit or sensor (1e) is arranged to work with circuit for the LED and/or laser (1g) to provide a desired light function, timing, colors, brightness, and/or illumination. The invention may include improvements on either or both of the following configurations:

The LED and/or laser night light device forms images (1i) (1j) on an optics piece (1h) surface incorporated with laser processed film or an injection piece situated in front of the LED and/or laser (1g).

The LED and/or laser night light is a plug-in (1b) wall outlet night light or direct current operated desktop LED and/or laser night light (FIGS. 7 to 20) which has an image shown on the film (1h) or injection piece surface, or desktop light has detachable cover. One preferred embodiment to show image or patterns on surrounding wall, ceiling, surface outside of the night light.

Figure 6:
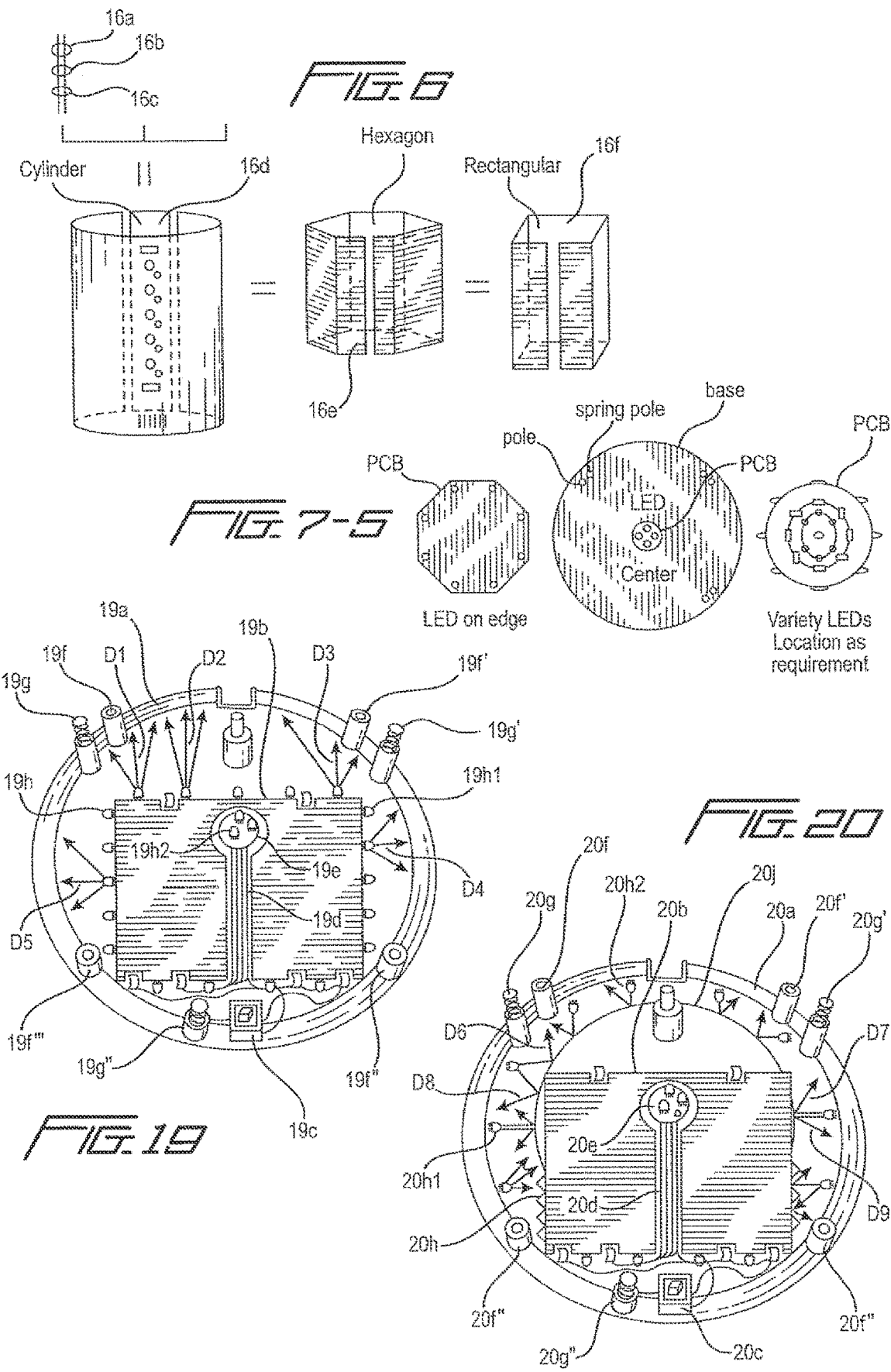
FIG. 6 shows a different construction of a plug-in type night light with different LED or LEDs specifications, arrangement, size, and/or color with desired optics means surrounding the LED or LEDs.

As shown in FIG. 1, a preferred plug-in night light has a base (1a) with prong (1b) to connect with a power source and a sensor (1e) to turn on and off the said LEDs and/or laser (1g) when the environment becomes dark. A desired number of LEDs and/or laser (1g) are installed on a conductive circuit board (1e) to emit a light beam to the optics piece (1h) which are preferably in the form of a laser processed film or injection piece (1h) that forms the incoming LED and/or laser light beam into a desired light image such as a star, dots, circle or any other configuration known to the marketplace or created from a laser lab. The preferred image in this embodiment is a star (1i) or Dots (1j), or any combination thereof. The conductive circuit board (1e) can be printed circuit board, electric wires, isolated copper wires, and/or directly soldered LEDs and/or laser, depending on market requirements. The top housing (in) is one of a transparent lens, cone, or tube with preferred optics properties to cause the inner image (1i) (1j) to exhibit more eye-catching effects. It can be just a simple plastic tube, stuff toy, candlelight, or cone unit as desired housing for project or pinhole imaging light. As shown in FIG. 6, the inner LED and/or laser use a variety of alternative LED types such as (16a) which has an LED chip fixed on two isolated copper wires (16e) and sealed by epoxy or plurality chip or dice LED(s) on a PCB with coating material as COB light source.

The LED type can also be LED dice (16b). The LEDs can be arranged inside a cylindrical laser optics piece (in a film or injected piece) with a desired arrangement as illustrated in FIG. 6 (16d), on the inside of a hexagonal laser optics piece (16e), or arranged inside a rectangular laser optics piece (16f).

FIG. 2 shows a plug-in LED night light (2a) with projection features. At least one LED (not shown) serves as a light source to supply visible light beams. At least one tele-scoping optics-means (2d) is combined with the LED or LEDs and at least one of slide(s) (2i), film, openings (2e), cut-outs, a transparent material piece (2m), a translucent material, grating piece, and hologram piece; to project the desired image, message, data, logo, or time on a ceiling, walls, floor, desired surface, or optics means surface. At least one of the power source (2b), circuit (inside of 2a), and trigger means (2e) is arranged to work with the LED or LEDs to get a desired light function, timing, colors, brightness, and/or illumination. The LED night light device (2a) with projection features has a changeable slide (2i), film, angle, position, orientation, light functions, and/or light effects features.

As shown in FIG. 2, the one of geometric shape night light (2d) with a preferred circuit inside the base (2a) to turn on the LED and/or laser and supply a light beam to project the image forming unit's (2i) image to the top ceiling. The night light has a top lens (21) align to an opening (2e) to allow the lens (21) to be installed and project the image to the top ceiling. The tube (2m) has a cut-out to allow a rotatable image forming unit or slide disc (2g) to be installed and change the image forming unit(s) or slides (2i) by rotating the slide-disc (2g) to one of plurality of the image forming unit or slides (2i). wherein, the night light can be any shape made by any material such as toy, stuff toy, candlelight.

Figure 3:
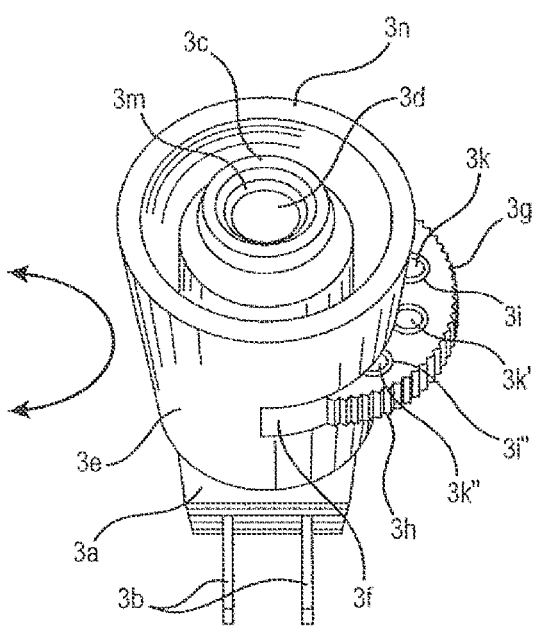

FIG. 3 shows more details of the construction of the embodiment illustrated in FIG. 2. This embodiment has a prong (3b) on the any geometric shape plug-in night light (3a) with a top lens (3d) that has a top opening (3m) to allow the tube (3c) to be installed and allow the image to project through the top optics-lens (3d) to the ceiling. The rotatable disc (3g) has a plurality of image forming unit(s) or slides (3k) (3k') (3k") well installed on the discs opening(s) (3i) (3i') (3i") so that the image forming unit(s) or slide can easily be changed by rotating the disc (3g) to project the preferred image on the ceiling or desired location(s). The tube (3m) has a cut-out (3f) to facilitate installation of the rotating disc (3g).

Figure 4:
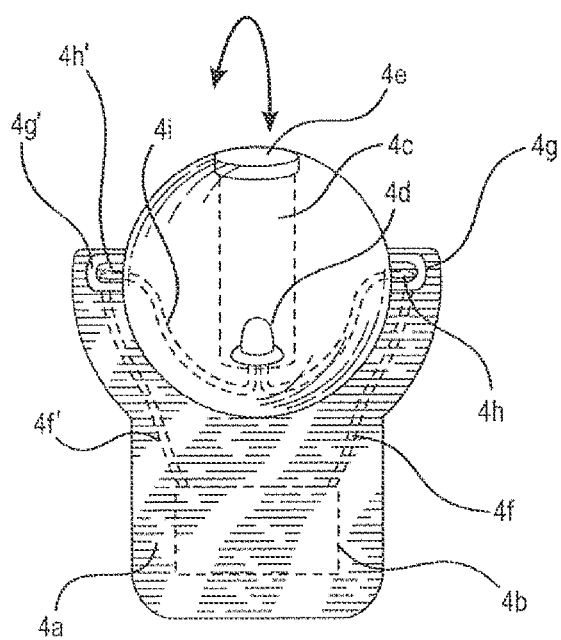
FIGS. 4 and 5 also show different viewing angles of the current invention's image projection on a wall, ceiling, floor, or optics means surface by a plug-in type night light featuring rotating means for changing a projection angle.

FIG. 4, shows a plug-in or DC powered stuff toy LED and/or laser project or pinhole imaging light (4a) with projection features. At least one LED and/or laser (4d) serves as a light source to supply visible light beams. At least has one inner tube (4c) is install any shape, material light housing such as ball, stuff toy, electric candlelight housing and fit the LED (4d) and image forming unit(s) or slide(s) (not shown), a film, openings, cut-outs, a printing piece, a translucent housing (ball or stuff toy), grating piece or hologram film; to project or create pinhole imaging effect(s) or the desired image, message, data, logo, or time on a ceiling, walls, floor, desired inner housing or outside housing surface, or on detachable outer cover surface. At least one power source (not shown), circuit, battery (4b), wire (40f) (4g) (4h) (4i), and trigger unit (not shown) is arranged to work with the LED and/or laser (4d) to get a desired light function, timing, colors, brightness, or illumination. The LED project light device (4a) with projection features with or without a changeable direction (the ball can rotate or toy can move), position (the ball can rotate), orientation (the ball can rotate), light functions, and light effects features.

FIG. 4 shows preferred geometric shape, material plug-in LED and/or laser light (4a) having a power source and circuit (4b) inside the base with conductive unit (4f) (4g) (4h)(4i) to deliver electric signals to the LED (4d) and supply the sufficient brightness light into the tube (4c) and top image forming unit or slides or one image forming unit or slide of FIG. 3 rotating disc (3k, 3K',3k") to allow the image to be projected to the top through the opening (4e) of the ball, stuff toy, or electric candlelight housing. The ball, stuff toy, or electric candlelight housing has a rotatable electric connector (4g) (4h) and (4g') (4h') to allow the electric signal to be delivered from the base to inside the light source(s). For upgrade model, It also offers a rotating property to allow the ball housing to be rotated so as to cause the tube (4c) to project the image to a desired location, surface, or areas.

Figure 5:
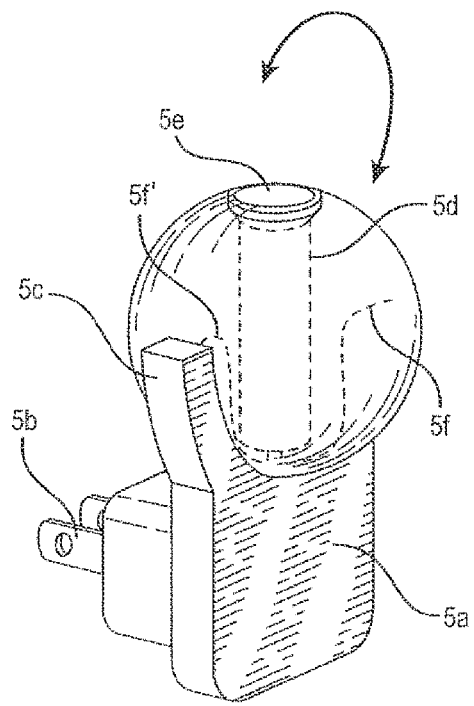

FIG. 5 shows one of preferred a simpler construction in which the plug-in night light with projection features (5a) has a power source input from a prong (5b) that passes through an inner circuit (not shown) and conductive wire (5f) (5i) to an inner LED and/or laser light source(s) to supply super bright light beam to project image, light patterns, plurality split laser patterns, contour image to area. The housing can be a stuff toy, electric candlelight.

Figure 7:
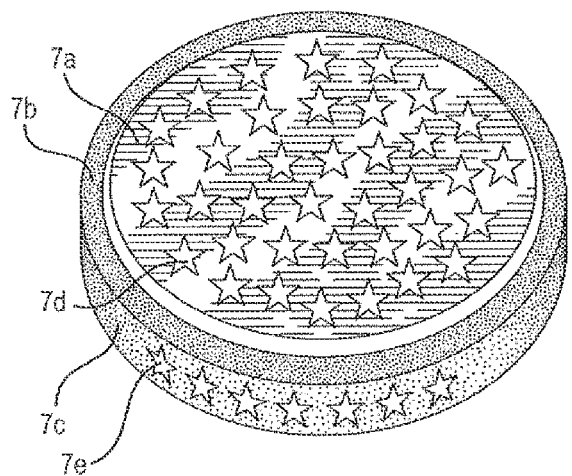
Figure 8:
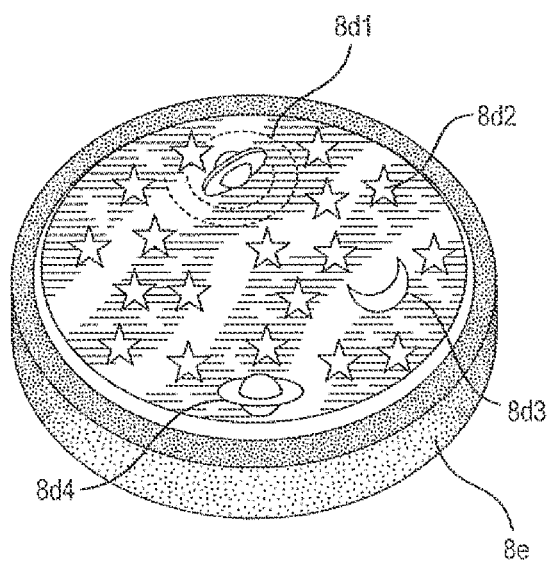
Figure 9:
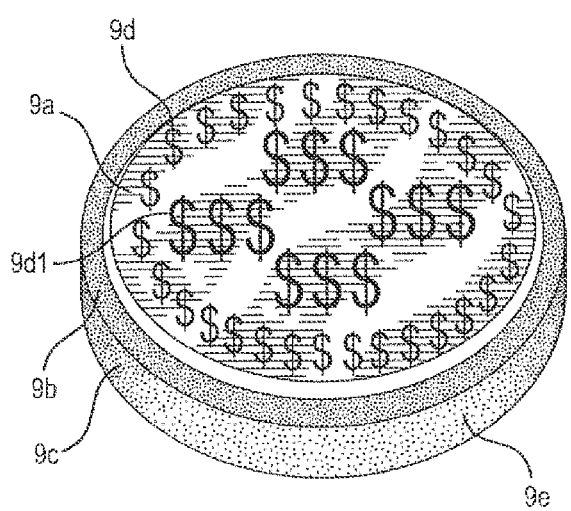
Figure 10:
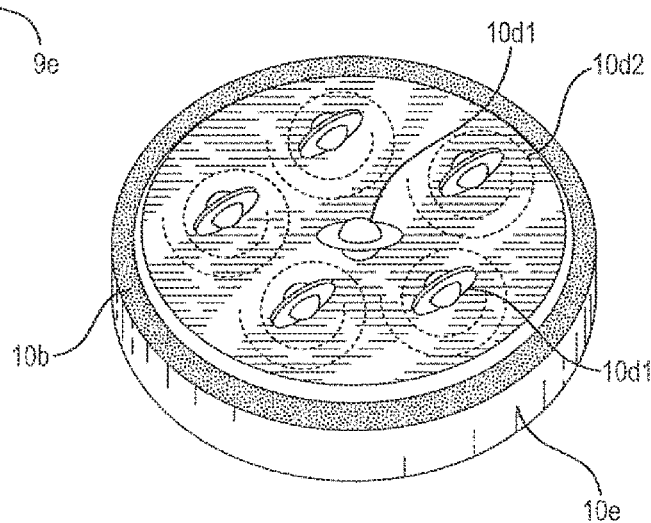
Figure 11:
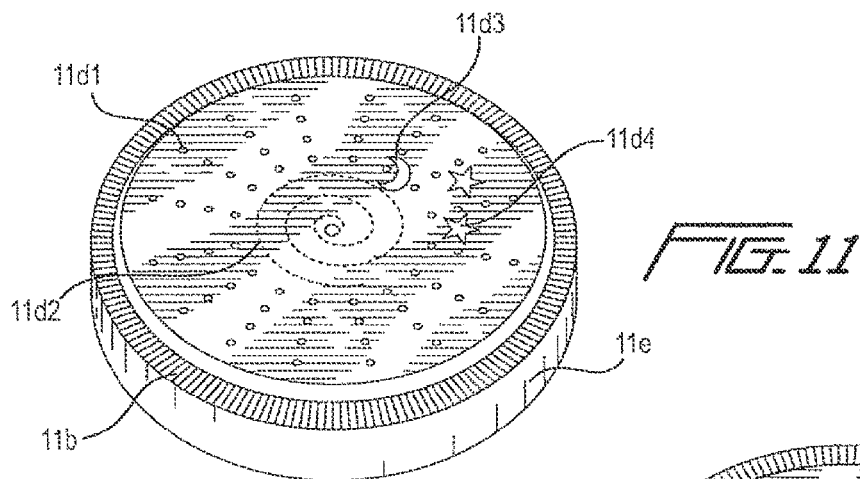
Figure 12:
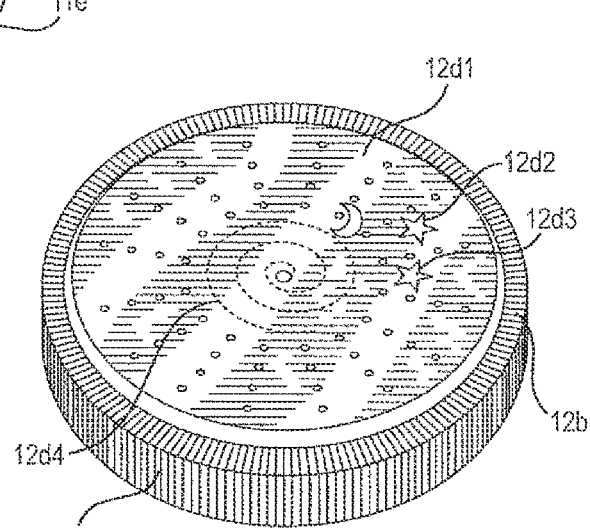
Figure 13:
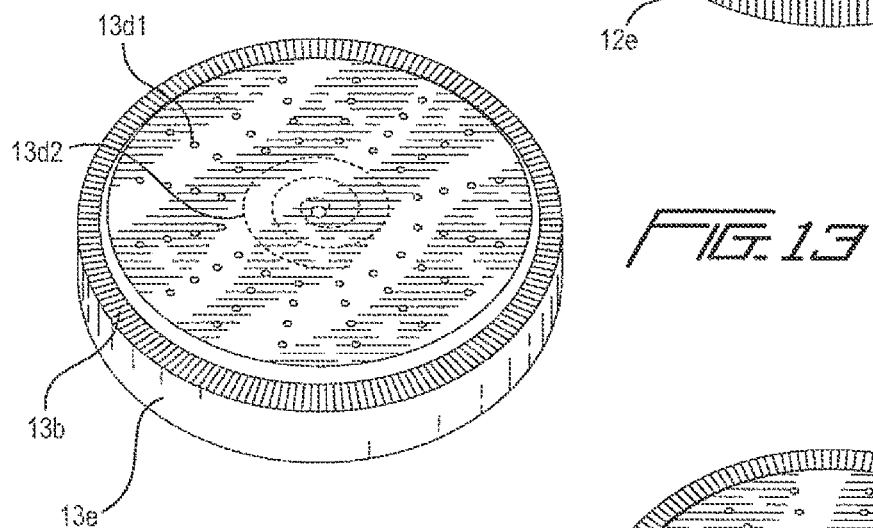
Figure 14:
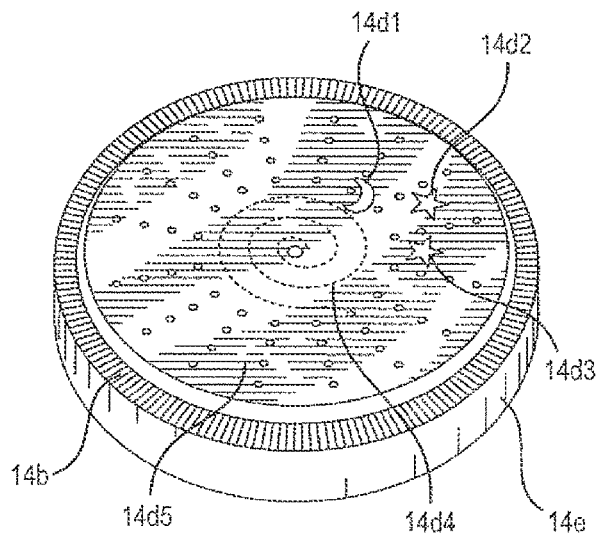

FIG. 7-1 shows a direct current operated LED and/or laser light (71) in a geometric shape (dome) made of plastic or it is stuff toy made textile for desired shape such as teddy bear or other cartoon, animal shape; having projection or pin-hole imaging features. At least one LED and/or laser light source (71i) serves as a light source to supply visible light beams. At least one of the optics piece (71d) in coiled or cover (71b) has geometric shape, structure; surrounded LED and/or laser light source (71i). The optics piece may be selected from the group including an optics film (71d), piece having openings or cut-outs (71d), printing piece (71d), translucent material housing or stuff toy (71b), grating or hologram piece (71d); to create a desired image (not shown), message, data, logo, or time on a ceiling, walls, floor, desired surface, or the optics means surface (71a). At least one of the power source (not shown), circuit (71h), and trigger means (71q) is arranged to work with the circuit (71h) for LED (71i) and/or laser light source (71i) to obtained a desired light function, timing, colors, brightness, illumination, and/or light effects. The improved LED and/or laser light (71) with projection or pinhole imaging features is a direct current (D.C.) power source LED and/or laser or stuff toy (depend on housing design) which can be turned on when the housing (71b) or switch (71q) is touched or pushed. The said DC power source may be in the form of an AC adaptor with a jack, or a solar power source, wind power source, chemical power source, generator power source, or any external (DC) direct current power source input power through light built-in port(s), female receiving end.

As shown in FIG. 7-1, the laser processed film or optic piece (71d) is in the form of a circle shape (71d) arranged to surround light source(s) or inner housing (not shown). While The laser processed film (71d) printed piece, slide piece, or injected piece (71d) is in the form of a circle (71d) (18a) (17c), round (72e), or dome with cut, shape windows (not punch through), printing, art (73a) (74b) shape. One preferred optics piece (71d) in circle or coiled is arranged surrounding light source(s) and one round optics piece (72e) is arranged on the top. The dome shape or other material in geometric shape outer housing (71a) is one of fixed, detachable, movable, reassemble figure, unit, or cover is situated a distance D from the light source (71i). For one of laser light, the distance D is very important when making the laser processed film. The distance D is fixed, and then the laser process film is arranged to form a desired image on the laser processed film, injected piece, or project outside wall, ceiling, or desired surface(s). The laser processed film provide a desired image depending on the distance (D), which determines the number of images, the size of the images, configuration of the images. It will therefore be appreciated that the distance (D) between the processed film and the light source (71i) is very important to enable a perfect laser image to be shown on the surface of the processed film, injected piece, or project outside wall, ceiling, or desired surface(s).

As shown in FIG. 7-1, one of preferred LED and/or laser light has the LED (71i) is installed on a printed circuit board (71h) on a base (71g). The height of base (71g) can be adjusted within distance (dd1). The adjust kits of this preferred embodiment has a screw-nut (71f) with a center hole to receive a screw-bolt (71j) to allow the base (71g) to adjust the height of the LED and/or laser light source(s) position. The LED and/or laser light source(s) (71i) can emit light to the at least one relatively front laser processed film (71d) when the laser light source(s) are arranged to emit light to the laser processed, grating, optics film (71d) and LED emit light to front optics piece (71d). This combination of LED and laser light source embodiment apply for night light, stuff toy, electric candlelight can provide a very pretty color image on the inner housing walls (71c) or on the surrounding wall outside the light while move out detachable opaque top cover. wherein, the LED light further incorporate with IC to make at least one of color, image, patterns, and brightness changing As shown in FIG. 7-2, the flat or dome shape laser processed film, all above discussed film, or injected piece (72c) is positioned in a horizontal position on top light source(s) (72i) so that the image will be seen on a top cover surface or on ceiling outside the said DC powered desktop light or geometric shape stuff toy or electric candlelight housing (72). The upgrade model having adjustable kits in this preferred embodiment uses detents (72j) and a receiving hole (72k) to hold position at a certain height. The chip or dice LED and/or laser light source(s) (72i) inside the base (72h) can therefore have an adjustable height to change the distance (D) of the laser processed or other film (72c) with light source (72h) and change the image. The adjustable means has height adjustment range (dd2).

As shown in FIG. 7-3, a wall (75a) is located on between top housing/cover and the lower housing/base (75b). The adjustable kits (75d) (75e) has a height adjustable range (dd3) to change height.

FIG. 7-4 shows one preferred arrangement for enabling the laser processed or other optics film (76b) to fit into a dome shaped top housing/cover (76a). The flat film cannot fit into the ball shaped dome, so multiple cuts (76b) (76c) (76d) (76e) (76f) must be made into the film. This is an economical arrangement to make a low-end product. An upgraded model with an injected piece may utilize the grating or hologram techniques disclosed in the inventor's prior art U.S. Pat. No. 5,667,736.

FIG. 7-5 an arrangement of the LED and/or laser light source(s) on a PCB in the lower housing. The PCB can be any size as long as it is smaller than the lower housing/base. The LED and/or laser light source(s) can be arranged on the center area or edge of the PCB to face upward or outward for different requirements to vary the distance (D) between the laser processed film/injected piece and the light source.

FIG. 7-6 shows a DC operated desktop LED and/or laser light, stuff toy, or electric candlelight with projection and/or pin-hole imaging features having at least one LED and/or laser light source (73*i*) to supply visible light beams, and least one optics piece (73*d*) surrounded LED and/or laser light source having at least one of an optics-lens, film, art, slide, printing, openings (star) (planet), cut-outs (moon), transparent material piece, different thickness optics lens to create nebula effects, translucent material piece in plastic or stuff toy unit (73*a*), grating piece, and hologram piece; to create a desired image, message, data, logo, or time; on a ceiling, walls, floor, desired surface, or on inner and/or outer housing-unit surface. At least one of a power source (73*m*) (73*m'*) (73*m"*) (73*m'''*), circuit, IC circuit (73*h*), and trigger means (73*o*) is arranged to control the LED or LEDs (73*i*) to obtain a desired light function, timing, colors, brightness, illumination, and/or light effects. The LED night light device (73) with projection and/or pin-hole imaging features is a direct current (D.C.) power source project light in variety type such as desktop light, plug-in outlet night light, stuff toy housing project light which can be turned on when the housing (73*a*) or switch (73*o*) has been touched or pushed. The direct current (DC) power source (73*m*) (73*m'*) (73*m"*) (73*m'' ''*) may take the form of an AC adaptor with a jack, or a solar power source, wind power source, chemical power source, generator power source, or any direct current power source available from the market. These features also similar with FIGS. 7-7,7-8, 7-9,7-10,7-11 and FIGS. 11 to 17

As shown in FIG. 7-6, the DC operated LED and/or laser light with projection and/or pinhole imaging features (73) has a top fixed or movable housing or cover (73*a*) with a plurality of openings (stars) (moon) (planet), slide, different thickness for nebular, printing, art, or cut-outs on a transparent or opaque housing or cover (73*a*). The upgrade model having one top housing or cover (73*a*) has a foldable skirt (73*d*) which can adjust the height of the top housing or cover (73*a*) to a higher or lower location to change the distance (D) of light source (73*i*) to surrounding the optics piece or film. The adjustable means can alternatively be provided for the LED's or LEDs' base (73*h*) to make the height adjustable from the LED base. The adjustable skirt (73*d*) or adjustable means on the LED base are preferred examples, but it will be appreciated that any functionally similar or equivalent construction may still fall within the current invention scope, so long as it makes the distance between the optics-means and light source adjust-able to get a clear image on the desired surface to fit all kind of room or space. From FIG. 7-6 desktop LED and/or laser light has preferred geometric shape or structure such as stuff toy or skirt, made in soft or rigid plastic, silicone material, cartoon characters shape or unit with or without IC, sensor, press sensor switch, manual switch, photo sensor, motor and gear set to rotating image forming piece or lens; to make desired color changing, color selection, moving, changeable lighted image and/or patterns. The alternative or equal function than said press and extendable skirt is one of geometric shape, structure of desktop battery operated project image and/or pattern LED light with tube to prevent light emit out to install inside any shape of housing such as electric candle, treetop light, stuff toy, kids toy, seasonal items as inventor parent or pending filed case (#II-2009) (#II-1) (#II-2) (#HH) series.

FIG. 7-7 shows a DC operated night light having a top optics-lens or cover (74*b*) with a plurality of openings or cut-outs (star) (moon) (planets) to allow the LED light beam to be emitted spread out to the desired surface. The trigger means (74*c*) is a switch (74*e*)(74*m*).

The switch at lower position of the top optics-lens or cover (74*b*) cover. One of prefer arrangement to keep switch in a same position against the top optics-lens (74*b*) and will be triggered when the top optics-lens been touched or pushed to turn the LED on and off or people to touch the switch directly to turn on the desktop LED and/or laser light effects. In order to get a clear projection image on a desired surface, the adjustable means (not shown) are provided on the LEDs' base to allow the LEDs (74*/*) to be moved up or down to provide a clear image for different rooms or space.

As shown in FIGS. 7-6 and 7-7, a preferred arrangement of batteries (73*m*) (73*m'*) (73*m"*) (73*m'' ''*) in a spiral spaced allows a plurality of LEDs (73K) (73}) (74*h*) (74*h'*) (74*h"*) to be installed as close to center as possible to increase the distance between the light source and optics means such as openings, cut-outs, laser processed film or an injected piece when applied to a wall location. The larger distance will create more exciting image or projection effects.

As shown in FIG. 7-6, LEDs and/or laser light source (73*i*) (73*j*) (73*k*) are situated very close to a center position so their light beams will emit to the top or surrounding wall areas to hit at least one fixed or moving or detachable, replaceable optics piece having at least one of openings, cut-outs, art, slide, printing, and laser processed film or an injected piece; to provide excellent image or projection effects on a desired surface. If the LEDs and/or laser light source(s) are too close to the top and/or surrounding optics piece, then the effects will be limit and tooling work become very difficult. Normally, a 2-10 cm+/−50% distance between a LED and/or laser light source with optic piece, processed film, or injected piece is very good and enables use of a variety of available optics piece, laser processed films, or injected pieces available from the marketplace so there will be no need for a big investment in tooling for too short a distance application.

From above FIGS. 7-1 to 7-7 show the features of current invention as below;

1. A DC powered LED and/or laser light creating lighted image or patterns to surrounding areas, comprising;
    at one LED and/or laser within a lower base or inner housing serves as a light source to supply visible light beams,
    at least one optics piece is or has slide, film, printing, painting, art, design arranged in at least one of (1) a circular and (2) a flat structure; surrounded or positioned on top of the at least one LED and/or laser; to create a desired image, pattern(s), and
    wherein, the light has
    (1) battery or rechargeable battery recharged by outside DC power through light built-in female receiving port (s),
    (2) at least one of trigger, pressure sensor, and switch;
    arranged to work with circuit for the at least one light source to obtain, change, set, or adjust at least one of a light function, timer, colors, brightness, illumination, and light effects; shown on at least one of
    (a) surrounding area that is at least one of a ceiling, wall, floor, desired surface; outside of light, and
    (b) inner housing surface or cover of the light, 2. A DC powered LED light that creating lighted image or pattern to surrounding areas, comprising;
    at least one LED installed on base or within light inner housing wall, at least one built-in or added-on optics piece arranged in a cylinder, coil, flat, or geometric structure that surrounds the at least one LED(s) or light inner housing with wall, and wherein, the optics piece has at least one of art, design, painting, words, and at least one of window, cut-out, pinhole(s); to create a lighted image and/or patterns to show on at least one of
(1) the surrounding areas outside light, and
(2) a light cover, and Wherein, the cover is one of fixed, movable, or replaceable cover assembled with the base with or without at least one of art, design, at least one window, opaque treatment, and holes, wherein the LED light is DC powered and has at least one of a
  (a) battery or rechargeable battery recharged by outside DC power source through light built-in female receiving port(s),
  (b) circuit,
  (c) LED(s) as light source,
  (d) At least one of trigger, sensor switch, and switch;
  to turn-on-off, set, select, change, or adjust light at least one of color, brightness, light function(s), and light effect(s) with or without integrated circuit (IC).

3. A DC powered An LED and/or laser light that emits an image or light patterns to surrounding areas as above discussed 1, wherein the top cover is or has at least one of (1) a dome, sphere, or half-ball shape, (2) a cartoon body, figure, or statue, and (3) a cover with a reflective and/or refractive property.

4. A DC powered An LED and/or laser light that emits an image or light patterns to surrounding areas as above discussed 1, wherein the top cover is a hard or soft material stuff toy, electric candlelight, or cover.

5. A DC powered LED and/or laser light that emits an image or light patterns to surrounding areas as above discussed 1, wherein the image and/or light patterns are formed by LED and/or laser light beam passing through the at least one of optics piece, and laser or grating film.

6. A DC powered LED and/or laser light that emits an image or light patterns to surrounding areas as above discussed 1, wherein the at least one LED is one of chip, dice, or DIP LED having at least one (1) single color LED, (2) multiple color LED, or (3) plurality of different color LEDs.

7. A DC powered LED and/or laser light that emits an image or light patterns to surrounding areas as above discussed 1, wherein the top cover of the light is a piece having opaque or whitening treatment, or a white injected piece, configured to be detached from and/or assembled to the LED light.

8. A DC powered LED and/or laser light that emits an image or light patterns to surrounding areas as above discussed 1, wherein the image and/or light patterns are shown on an opaque cover that is opaque, whitened, or injected with opaque or white colors while has inner housing surrounded by optics piece(s).

9. A DC powered LED and/or laser light that emits an image or light patterns to surrounding areas as above discussed 1, wherein light exhibits at least one of a fixed, changeable, moving, or rotating light effect or function.

10. A DC powered LED light that creating lighted image or pattern to surrounding areas, as above discussed 2, wherein the top cover is or has at least one of (1) a dome, sphere, or half-ball shape, (2) a cartoon body, figure, or statue, and (3) a cover with a reflective and/or refractive property.

11. A DC powered LED light that creating lighted image or pattern to surrounding areas, as above discussed 2, wherein the top cover or housing made of a hard or soft material in geometric shape; having light passable area(s), opening, or hole(s).

12. A DC powered LED light that creating lighted image or pattern to surrounding areas, as above discussed 2, wherein the image and/or light patterns are formed by LED light passing through the at least one optics piece to surrounding and/or top surface(s), areas where is outside light.

14. A DC powered LED light that creating lighted image or pattern to surrounding areas, as above discussed 2, wherein the at least one LED is one of chip, dice, or DIP LED having at least one (1) single color LED, (2) multiple color LEDs, or (3) LED has built-in plurality of different color chips or dice(s).

15. A DC powered LED light that creating lighted image or pattern to surrounding areas, as above discussed 2, wherein the top cover of the LED light is a piece having opaque or whitening treatment, a white injected piece; configured to be detached from and/or assembled to the LED light.

16. A DC powered LED light that creating lighted image or pattern to surrounding areas, as above discussed 2, wherein the image and/or light patterns are shown on an opaque cover that is opaque, whitened, injected with opaque or white colors; while light has inner housing surrounded by optics piece(s).

17. A DC powered LED light that creating lighted image or pattern to surrounding areas, as above discussed 2, wherein LED light exhibits at least one of a fixed, changeable, moving, or rotating light effect or function.

It is appreciated from FIGS. 2,3,4,5 and FIGS. 7-1 to 7-7, the current invention also has features as below;

18. A DC powered LED and/or laser light system project image and/or patterns fit into geometric shape product, comprising:
At least one light system including;
  (1) At least one of LED, Laser, and LED and laser as light source to emit light into a tube which prevent light beam leakage out, and tube has built-in image forming unit, and
  (2) The light beam emits to image forming unit to form tiny lighted image(s) and/or pattern(s) and pass through top project-lens to create projected image(s) and/or pattern(s) shown on at least one of ceiling, wall, fence, garage door, entrance doo, and desired surface(s).
  (3) At least one DC power source, circuit for light to operate light function, effects.

Wherein, the said light system is fit within geometric shape plastic, stuff toy, toy, electric candlelight, night light, and desktop punk light; with or without at least one of IC, remote controller, wireless system, Wi-fi and download APP control system, blue tooth connection, sensor, and switch.

FIGS. 7-8, 7-9, 7-10 show three preferred embodiments having different distances (d4) (d5) (d6) between the top or surrounded optics piece (77*a*) (78*a*) (79*a*) and light source (77*f*) (78*e*) (79*c*). The top optics-lens may be in the form of openings, cut-outs, laser processed film or an injected piece. The night light of this embodiment also has adjustable means (77*h*) (79*e*) with a height adjustable range for (dd4) (dd6) that enables a clear and exciting image to be shown or projected on the desired surfaces. Wherein, these preferred embodiments have DC operated power utilizing batteries and/or a variety of input power sources as discussed above.

FIG. 7-11 shows different arrangements for LED on edge, center, donut, or different diameter circles on lower position Printing circuit board (PCB). Wherein, the LED(s) is one of (1) dice, chip, dip LED, or (2) COB (Chips on board) with top coating material to emit a surface substantial even brightness illumination not same individual dice, chip, dip LED(s) which emit out a super bright spot light which is not a surface, area illumination.

FIGS. 7, 8, 9, and 10 show preferred projection DC operated LED and/or laser night lights with special configuration of optics film, laser film, grating film (7a) (7e) (8d1) (8d2) (8d3) (8d4) (9d) (9e) (10dl) (10d2) (10e), or with openings or cut-outs on the top or surrounded optics piece. Some models also have the openings, cut-outs, laser processed film, or an injected piece on walls (7c) (8e) (9c) (10e) to allow the projection or pin-hole image to be seen on a desired surface.

FIGS. 11, 12, 13, and 14 show a preferred LED and/or laser projected and/or pin-hole image created by a DC operated desktop LED and/or laser light with special combination of LED and laser image including stars (11d3) (lld4), dots (11dl) (12dl) (13dl) (14dl), a silver river (lld2) (12d4) (13d2) (14d4), moon (11d3) 914dl), planet (not shown), sun, (not shown) or other desired image on the top optic-lens and on the wall (12e).

It will be appreciated by those skilled in the art that the projection and/or pinhole imaging for single or combination of laser and LED image optics effects can be present in the same unit because both use LED and laser light source(s) both for light source and incorporated with desired combination of openings, cut-outs, art, printing, painting, slide, different thickness, diffusor optics piece, and laser processed film or injected pieces for the current invention(s).

FIGS. 15, 16, 17 18 show one of a preferred DC operated desktop LED and/or laser light for project and/or create pinhole desired LED and laser image (17b) (17c) (18b) (18c) for projection or for displaying an image on a desired surface. It can project and/or pin-hole imaging of LED and Laser for any geometric image or light patterns such as a dollar sign by an opening, cut-outs, slide, printing, art, or laser processed film or injected piece. The lower housing (19a) has a battery compartment (19b) and switch (19c) with assembly poles (19f) (19f') (19f") (19f''') and spring members (19g) (19g') (19g") (19''') to bias the top optics-lens (15c) to an upward position so that pushing the top optics-lens (15c) or touch the switch (not shown) will turn the light device or LED on and off. The LED and/or laser light source(s) (19h2) are positioned on a PCB (19e) and connected with the power source by conductive wires (19d) to supply the electric signals go through the switch to turn the LED and/or laser(s) on and off to obtain pre-determined functions, brightness, color, effects, and/or performance. The plurality of LEDs and/or laser light source(s) also can be installed along the battery compartment edge. One of preferred upgrade arrangement would be similar to that shown in FIGS. 7-5, 7-6, and 7-7 to provide a larger distance between the light source and optics-means as discussed above, in which case the plurality of LEDs and/or laser light source(s) along the battery compartment will create an exciting projection or image on the desired surface.

FIG. 19 show an arrangement that is similar to that shown in FIG. 20. The major differences are that the plurality of LEDs and/or laser light beam inwardly towards wall or edge (20h) having laser grating or hologram film and get a lot of light spots emit outward (D7)(D8)(d9), the light spots then hitting the surrounding optics piece (not shown) to shown LED and/or laser project and/or pinhole images on desired surface. This teaching of adding the extra laser, grating, hologram optic piece on inner housing of the night light is helpful to increase the number of laser and/or LED images or light patterns.

This application includes subject matter in common with co-pending U.S. patent application Ser. No. 12/318,470 ("LED night light with Project features"), and any concepts, drawings, and designs disclosed therein that are applicable to the current invention should fall within the scope of the present application, including any equivalent, same function or replaceable alternative arrangement.

While the above-discussed and mentioned preferred embodiments help illustrate the scope of the current invention, it is to be appreciated that any alternative or equivalent functions of design, construction, modification, or upgrade may still fall within the scope of the invention, and that the current invention is not limited to the details described or mentioned above. Any alternative or equivalent arrangement, process, installation, design, or changes from the current invention may still fall within the scope of the current invention, including variations in the power source, conductive unit(s), geometric shape of LED and/or laser light source(s), connector, circuit, sensor, switch, LED and/or laser light source(s) elements, attachment kits, fixing kits, tightening kits, resilient conductive piece(s), and so forth.

I claim:

1. A DC powered LED and/or laser light for displaying an image or light patterns, comprising:
   at least one light source that includes at least one LED and/or laser;
   a lower base; and
   at least one optics piece that includes a cylindrical film having windows, pinholes, cutouts, printing, or painting for forming the image or light patterns when light from the at least one light source passes through the film,
   wherein the cylindrical film extends around the DC powered LED and/or laser light and is assembled to the base,
   wherein light from the at least one light source passes through the at least one optics piece to create the image or light patterns, and
   wherein the at least one light source is mounted on the lower base by a height-adjustment kit for adjusting a distance of the at least one light source from the base, whereby adjustment of the height of the at least one light source relative to the base changes said image or light patterns.

2. A DC powered LED and/or laser light for illumination or displaying an image or light patterns as claimed in claim 1, wherein the at least one LED is one of a chip, dice, or DIP having at least one of a (1) single color, (2) multiple colors, or (3) a plurality of different colors inside one LED.

3. A DC powered LED and/or laser light for illumination or displaying an image or light patterns as claimed in claim 1, further comprising a top cover, wherein the top cover is opaque, whitened, or injected with opaque or white colors.

4. A DC powered LED and/or laser light for illumination or displaying an image or light patterns as claimed in claim 1, wherein the LED and/or laser light exhibits at least one of a fixed, changeable, moving, or rotating light effect or function.

5. A DC powered LED and/or laser light for illumination or displaying an image or light patterns as claimed in claim 1, wherein the adjustment kit comprises a bolt extending from the base and a nut to which the at least one light source is fixed.

6. A DC powered LED and/or laser light for illumination or displaying an image or light patterns as claimed in claim 1, wherein the adjustment kit comprises a detented member extending from the and an annular structure to which the light source is fixed and which includes openings for receiving at least one of said detents to adjust the height of the light source relative to the base.

\* \* \* \* \*